May 12, 1936. P. M. STIVENDER Re. 19,966

CONTROL SYSTEM

Original Filed Nov. 22, 1929

Inventor
P. M. Stivender
by G. P. Wilson
Attorney

Reissued May 12, 1936 Re. 19,966

UNITED STATES PATENT OFFICE 19,966

CONTROL SYSTEM

Paul M. Stivender, West Allis, Wis., assignor to Allis-Chalmers Manufacturing Company, Milwaukee, Wis., a corporation of Delaware Original No. 1,844,719, dated February 9, 1932, Serial No. 409,071, November 22, 1929. Application for reissue December 26, 1933, Serial No. 704,033

20 Claims. (Cl. 290—4)

This invention relates to electrical control systems, and more particularly to systems which respond to or control the relative frequencies of sources of alternating current. For the sake of brevity the words "alternating current" will be hereinafter abbreviated to A. C.

One of the objects of the invention is the provision of means responding to the relative frequencies of two A. C. sources, and more particularly the production of predetermined effects in response to effective operation of said means. A more specific object is the provision of means whereby the frequencies of the two sources are brought to the same value in response to said means.

A further object is the provision of means responding to the relative frequencies of two A. C. sources which comprises relays as its essential elements. A more specific object is the provision of means whereby the relays are caused to be effectively operated in different predetermined orders depending upon the relative frequencies of the two sources.

This invention is an improvement on that disclosed in applicant's copending application S. N. 409,072, filed November 22, 1929, which matured into Patent No. 1,844,720 on February 9, 1932, and a further object is the simplification of the system disclosed in said copending application, and more specifically, the reduction of the number of relays necessary for attaining the hereinbefore mentioned objects. Other objects will appear hereinafter as the description of the invention proceeds.

The novel features of the invention will appear from this specification and the accompanying drawing forming a part thereof and showing one embodiment of the invention, and all these novel features are intended to be pointed out in the claims.

Figure 1:
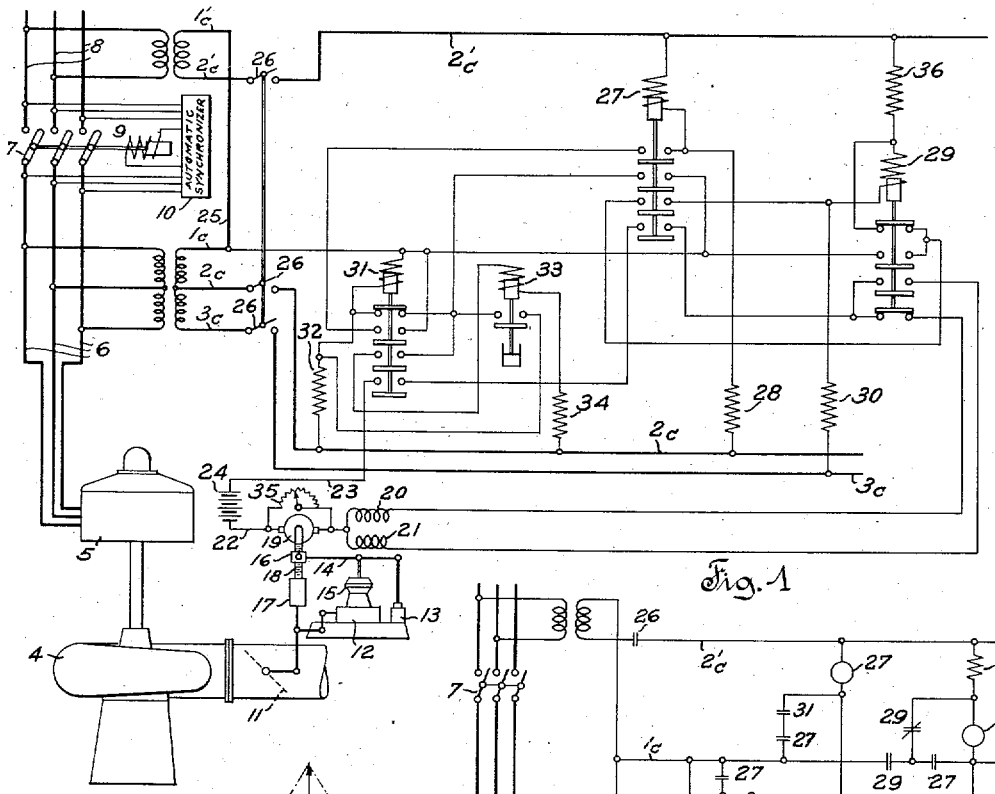
Fig. 1 is a diagrammatic view of one embodiment of the invention as it may be applied in the control of a polyphase generator.

Referring to Fig. 1 of the drawing there is here shown a prime mover 4, indicated as a hydraulic turbine. It is to be understood however that the invention is not limited in its application to any particular form of prime mover. The turbine 4 drives a generator 5 supplying the three phase conductors 6 which may be connected by means of a switch 7 to a three phase line 8. The switch 7 is here shown as provided with an operating coil 9 which may be energized by means of any suitable form of automatic synchronizer. Inasmuch as the synchronizer forms no part of the present invention it has merely been indicated in the drawing.

The turbine 4 is shown as controlled by means of a gate 11 in the conduit supplying operating fluid thereto. It is of course to be understood that any of the usual means for controlling the supply of operating fluid to a prime mover may be employed. The gate 11 may be operated by means of a servo-motor 12 which is indicated as controlled by a regulating valve 13. The regulating valve 13 is here shown as controlled in the usual manner by means of a floating lever to the floating pivot of which is connected a centrifugal speed responsive device contained in the casing 15. The other end of the floating lever 14 is pivotally connected to a nut 16 which is in operative relation to a screw 18. The lower end of the screw 18 is suitably connected to the usual dash pot or compensating device 17 the other element of which is operated in unison with the motion of the gate 11. These parts have been shown in diagrammatic form as they are well known in the art and their specific embodiment forms no part of the invention. The screw 18 may be rotated by means of a motor 19 here shown as of the direct current split field type, the field windings being indicated as 20 and 21. One terminal of the armature of motor 19 is connected to a bus 22 the other terminal being connected to a common terminal for the field windings 20 and 21. The other terminals of the field windings are connectible to another bus 23, so that if field winding 20 is connected to bus 23 the motor 19 will rotate in one direction whereas if field winding 21 is connected to bus 23 it will rotate in the other direction. The buses 22, 23 are fed from any suitable source here indicated as a battery 24.

Connected across two of the phase conductors of the polyphase line 8 is a transformer the terminals of the secondary of which are connected to conductors 1'c and 2'c. To the corresponding phase conductors of the generator 5 which are connectible to the same conductors to which the beforementioned transformer is connected, is connected a transformer the secondary terminals of which are connected to conductors 1c and 2c. Another pair of the phase conductors leading from the generator has connected thereto a transformer the secondary terminals of which are connected to the conductor 2c and a conductor 3c. The conductor 1'c is connected by means of a conductor 25 to the conductor 1c. The conductors 2'c, 2c and 3c are extended to control relays as will appear hereinafter, and these conductors may be controlled by a switch 26 in any suitable fashion.

A relay 27 has one terminal connected to conductor 2'c and the other connected, through a resistance 28, to conductor 2c. A relay 29 has one terminal connected to the conductor 2'c, there being a resistance 36 interposed as here shown, and the other terminal, through a resistance 30, to the conductor 3c. A set-up relay 31 is here shown as having one terminal connected to the conductor 1c and the other, through a resistance 32, to the conductor 2c. An adjustable time limit relay 33 is here shown as connectible across the conductors 1c, 2c through a resistance 34.

Figure 2:
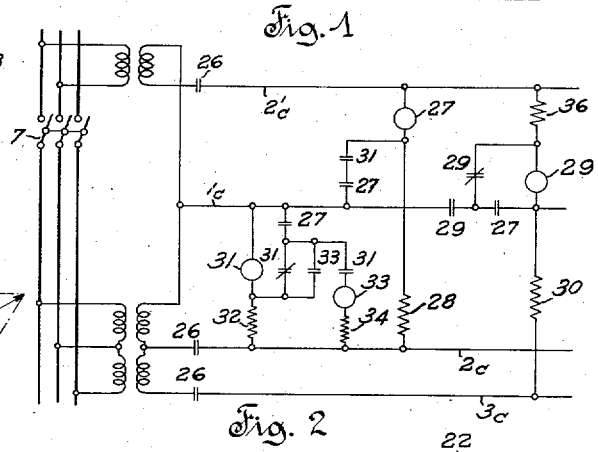
Figs. 2 and 3 are across-the-line diagrams of the same circuits as illustrated in Fig. 1.
Figure 3:
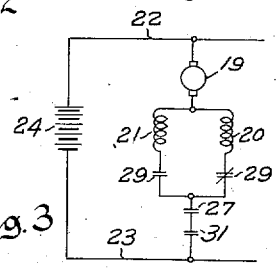

Referring again to relay 27, this is here shown as provided with four contacts all of which are front contacts. By front contacts is meant contacts which are adapted to close a circuit when the relay is energized. In the across-the-line diagrams of Figs. 2 and 3 front contacts are indicated by a pair of parallel lines. The relay coils in the said diagrams are indicated by circles, and the coil and contacts of a given relay bear the same reference numeral. One of the contacts of relay 27 controls the circuit of motor 19; another is in a holding circuit for relay 27; another is in a shunt or lockout circuit for relay 29; and another controls relay 33 and two possible shunt or lockout circuits for relay 31.

Relay 29 is here shown as provided with four contacts two of which are front contacts and two back contacts. By back contacts is meant contacts which are adapted to open a circuit when the relay is energized. In the across-the-line diagrams of Figs. 2 and 3 back contacts are indicated by a pair of parallel lines crossed by a diagonal line. One of the front contacts of relay 29 and one of the back contacts thereof are in circuits for the field windings 21 and 20 respectively. Another front contact of said relay is in the holding circuit for relay 29. The other back contact of relay 29 is in a shunt or lockout circuit for said relay.

Relay 31 is here shown as provided with four contacts three of which are front and one back contact. One of the front contacts controls a circuit for motor 19; another front contact controls the circuit for relay 33; and another front contact is in the holding circuit for relay 27. The back contact of relay 31 is in one of the lockout circuits for said relay.

Figure 4:
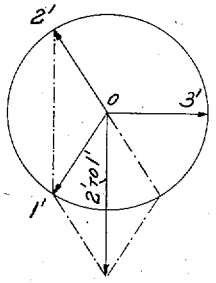
Figs. 4 and 5 are vector diagrams illustrating electromotive forces which are applied to certain parts of the system and Fig. 6 is a diagram illustrating various vector polygons resulting from a combination of certain vectors in Figs. 4 and 5.
Figure 5:
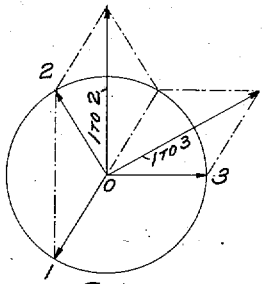

In order to determine the electromotive forces (hereinafter abbreviated to "E. M. F.'s") applied to relays 27 and 29 respectively under various conditions, the vector components of these E. M. F.'s will be considered first. Referring now to Fig. 4, the vectors 0—2' and 0—1' indicate E. M. F.'s between a neutral point 0 and the conductors 2'c and 1'c respectively. The phase-to-phase E.M.F. is then that indicated by the vector marked with the legend 2' to 1'. Referring now to Fig. 5 and assuming that the polyphase E. M. F.'s of the generator and line are in phase, the vectors 0—1, 0—2, and 0—3 correspond to the E. M. F.'s between a neutral point 0 and the conductors 1c, 2c, and 3c respectively. Since the circuit for relay 27 for example is as here shown from 2'c to 1'c to 1c to 2c, the E. M. F. across 1c and 2c is laid off in the reverse direction in the diagram in Fig. 5 and bears the legend, 1 to 2. The E. M. F. across the conductors 1c and 3c is laid off as the vector bearing legend, 1 to 3, in Fig. 5. In order to determine the E. M. F.'s across the relays 27 and 29 the vectors obtained as hereinbefore stated have been laid off in a diagram of vector polygons in Fig. 6.

Figure 6:
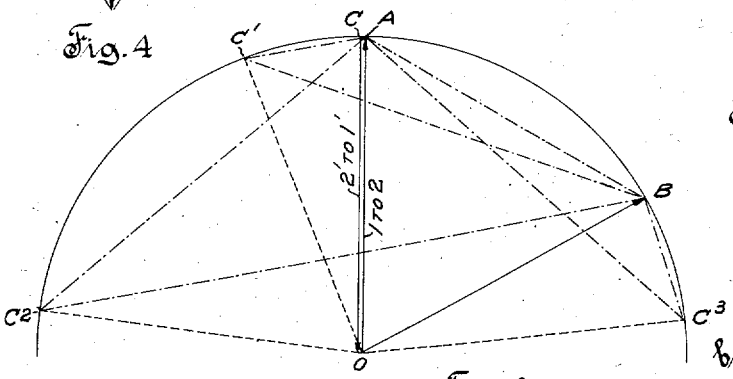

For the sake of convenience in forming the vector polygons the head of the arrow CO, representing the vector 2' to 1', is at the point 0 in Fig. 6, for various positions of that vector, while the tail of the arrow OA, representing the vector 1 to 2 is at the point 0. It may be noted that, for the sake of clearness, the vectors CO and OA are shown as side-by-side though they are actually superimposed when, as assumed, the generator and line are in phase.

It will be apparent from what has been previously stated that the E. M. F. across relay 27 is represented by the distance between the points C and A which, when the line and generator are in phase, is equal to zero. Moreover, since the circuit for relay 29 is from 2'c to 1'c to 1c to 3c, the E. M. F. across this relay is represented by the vector CB. Let it be assumed that this vector represents a potential difference of 100 volts and that the resistance 30 is so adjusted that for 100 volts across the conductors 2'c and 3c, the relay 29 will not be effectively energized. Let it further be assumed that in case the E. M. F. across these conductors rises to 130 volts that said relay will be effectively energized. The relay 27 may be adjusted in like manner by resistance 28 so that it will be deenergized at 100 volts across conductors 2'c and 2c and will be energized at 130 volts across these conductors. These voltages are given merely by way of example and it will be apparent that other values may be utilized.

In case the line and generator frequencies are not equal the vectors 1', 2', 3' and 1, 2, 3 will rotate at different speeds. In order to consider the effect of the relative rotation as between these vectors we may consider the vectors 1, 2, 3 as stationary and the vectors 1', 2', 3' as revolving with respect thereto. In connection with Fig. 6 this will mean that we will consider the vectors OA and OB as stationary and the vector CO as revolving about the point 0 in either one direction or the other depending upon whether the line frequency is above or below that of the generator.

If it be assumed that when the line frequency is below that of the generator, the vector CO rotates in a counter-clockwise direction, then when the outside end of said vector reaches the position C' the relay 29 will be effectively energized since the voltage across this relay is now represented by vector C'B, in the assumed instance, 130 volts. The energization of relay 29 closes the front contact of said relay in the circuit for field winding 21 and opens the back contact thereof in the circuit of field winding 20, but since relay 27 is deenergized, the motor circuit remains deenergized. When the vector CO reaches the position $C^2$ the relay 27 will be energized, the E. M. F. across this relay being then represented by vector $C^2A$ which in the instance assumed is 130 volts. It may be noted that the E. M. F. across relay 29 is represented by vector $C^2B$ and therefore this relay remains energized. The energization of relay 27 causes a front contact of that relay to complete a circuit for motor 19 through field winding 21 and through front contacts of relays 29 and 31. Another front contact of relay 27 completes a circuit for relay 33 through a front contact of relay 31. Another front contact of relay 27 locks relay 29 in, the relay 29 being then fed from conductors 1c and 2'c through front contacts of relays 29 and 27 and resistance 36. The remaining front contact of relay 27 locks said relay in, said relay being then fed from conductors 2'c and 1c through front contacts of relays 31 and 27. The motor 19 now rotates in such direction as to move the nut 16 in the proper direction for adjusting the governor to lower the speed of the generator 5.

Meanwhile, as stated above, the adjustable time limit relay 33 has been energized and after a predetermined time this relay closes its contact thereby shorting relay 31 through a front contact of relay 27. Relay 31 then drops out causing deenergization of relay 33. The dropping of relay 31 also has the following effects; the holding circuits of relays 27 and 29 are opened; the circuit of motor 19 is opened; and relay 31 is locked out by reason of the closure of its back contact. Since this lockout circuit is through a front contact of relay 27, relay 31 will remain locked out as long as relay 27 remains energized, and this depends upon the position of the rotating vector CO. As soon as this vector reaches any position such that the E. M. F. across relay 27 is 100 volts or less (in the illustrative example) relay 27 will drop out opening the lockout circuit for relay 31 and the relay 31 will be energized, and the cycle of operations hereinbefore described may be repeated. This cycle of operations will be repeated the oftener the greater the difference in frequency between the generator and the line. On the other hand, if the difference is slight the cycle will be repeated at comparatively long intervals since the rotation of vector CO is then very slow.

Let it now be assumed that the frequency of the line is above that of the generator, in which case the vector CO will rotate in a direction opposite from that previously assumed, that is, in a clockwise direction. If we begin again with the E. M. F.'s of line and generator in phase, both relays 27 and 29 are deenergized. When the vector CO reaches the point $C^3$ the E. M. F. $C^3A$ is sufficient to energize relay 27. Since that back contact of relay 29 which is in the circuit of the field winding 20 is closed at the time relay 27 is energized, a circuit is completed for motor 19 through field winding 20 and front contacts of relays 27 and 31. The energization of relay 27 also completes a holding circuit for said relay as hereinbefore described. Also, a front contact of relay 27 completes a lockout circuit for relay 29 through a back contact of relay 29. Another front contact of relay 27 energizes the adjustable time limit relay 33. The energization of the motor circuit as hereinbefore described causes the motor 19 to run in such direction that the frequency of the generator is caused to increase.

Meanwhile, the time limit relay 33 is moving its contact toward closed position and when the same closes, the relay 31 is locked out until relay 27 is deenergized, as previously described. Deenergization of relay 27 opens the lockout circuit for relay 29, and permits relay 31 to be reenergized. The cycle hereinbefore described may then be repeated.

It will be evident that when there is a large difference in frequencies between the generator and line the speed and frequency of the generator will be changed rapidly to cause it to approach that of the line and as the difference in frequencies becomes less the rapidity of change in the frequency of the generator is also decreased, thereby rendering synchronization between the generator and line very easy.

The speed at which motor 19 operates may be adjusted by any suitable means here shown as a rheostat 35.

When the generator has been brought to the same frequency as that of the line (whether it was at first higher or lower in frequency) the switch 7 may be closed when the generator and line are in phase and this may be accomplished in any suitable manner, if desired, by an automatic synchronizer 10 here indicated merely by an appropriate legend.

While the connections of the transformers for feeding relays 27 and 29 are preferred as shown, it will be apparent to those skilled in the art that the vector polygons as described in connection with Fig. 6 will apply equally well if the connections 1'c and 2'c are reversed, that is, the conductor 2'c leading to the upper (as viewed in Fig. 1) terminals of relays 27 and 29, becomes 1'c, and the conductor 25 is connected to terminal 2'c instead of 1'c. The only difference is that the condition represented by the vectors in full lines in Fig. 6 then represents the condition when the generator and line are 180 degrees out of phase. The principle of operation of the relays as hereinbefore described however remains unchanged as far as the control of the speed of the generator to bring the frequency to the same as that of the line is concerned.

It should be understood that it is not desired to limit the invention to the exact details of description shown and described, for obvious modifications may occur to persons skilled in the art.

It is claimed and desired to secure by Letters Patent:

1. In combination, a pair of polyphase A. C. sources, a pair of relays, means for so connecting said relays to said sources that from a predetermined phase relation of said sources said relays are energized in predetermined sequences dependent upon the relative frequencies of said sources, an electrical device, and means whereby energization of one of said relays at a time while the other of said relays is energized produces a predetermined effect on said device and energization of said one of said relays at a time while the other of said relays is deenergized produces a different predetermined effect on said device.

2. In combination, a pair of polyphase A. C. sources, a pair of relays, means for so connecting said relays to said sources that from a predetermined phase relation of said sources said relays are energized in a predetermined sequence at a time when the frequency of one of said sources is higher than the frequency of the other of said sources, and means whereby the energization of the last one of said sequentially energized relays at said time locks both of said relays in their respective energized positions for a definite time.

3. In combination, a pair of polyphase A. C. sources, a pair of relays, means for so connecting said relays to said sources that from a predetermined phase relation of said sources said relays are energized in a predetermined order at a time when the frequency of one of said sources is lower than the frequency of the other of said sources, an electrical device; means whereby energization of one of said relays at said time while the other of said relays is deenergized causes a predetermined effect on said device, and means whereby energization of said one of said relays at said time locks said relay in and locks the other of said relays out for a definite time.

4. In combination, a pair of A. C. sources, a pair of relays, means for so connecting said relays to said sources that from a predetermined phase relation of said sources said relays are energized in a predetermined order at a time when the frequency of one of said sources is higher than the frequency of the other of said sources, an electrical device, means whereby energization of one of said relays at said time while the other of said relays is deenergized causes a predetermined effect on said device, means whereby energization of said one of said relays at said time locks said relay in and locks the other relay out, and means for rendering said locking means inoperative after a predetermined time.

5. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection.

6. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection, a normally energized set-up relay having a contact in said connection, and means for deenergizing said set-up relay a predetermined time after said other of said pair of relays is energized.

7. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection, a normally energized set-up relay having a contact in said connection, means for deenergizing said set-up relay a predetermined time after said other of said pair of relays is energized, and means for reenergizing said set-up relay when said last named relay is again deenergized.

8. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection, a normally energized set-up relay having a contact in said connection, means for deenergizing said set-up relay a predetermined time after said other of said pair of relays is energized, and means whereby deenergization of said set-up relay locks the same out until predetermined conditions obtain.

9. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection, and means whereby energization of said other of said relays locks the said one of said relays in or out depending upon whether said other of said relays is energized or deenergized.

10. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection, a normally energized set-up relay having a contact in said connection, and means including a contact of said set-up relay whereby energization of said other of said relays locks said one of said relays in or out depending upon whether said other of said relays is energized or deenergized.

11. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection, a normally energized set-up relay having a contact in said connection, means including a contact of said set-up relay whereby energization of said other of said relays locks said one of said relays in or out depending upon whether said other of said relays is energized or deenergized, and means for deenergizing said set-up relay a predetermined time after said other of said relays is energized.

12. In combination, a polyphase A. C. line, a polyphase A. C. generator, a prime mover for driving said generator, a pair of relays, means for so connecting said relays to said line and generator that from a predetermined phase relation of said line and generator said relays are energized in a predetermined order dependent upon the relative frequencies of said line and generator, means including a pair of control circuits for raising and lowering the speed of said prime mover respectively, one of said relays having back and front contacts in said circuits respectively, a common connection for carrying current through both of said circuits, the other of said relays having a front contact in said connection, a normally energized set-up relay having a contact in said connection, means including a contact of said set-up relay whereby energization of said other of said relays locks said one of said relays in or out depending upon whether said other of said relays is energized or deenergized, means for deenergizing said set-up relay a predetermined time after said other of said relays is energized, and means for reenergizing said set-up relay when said last named relay is again deenergized.

13. In combination, a plurality of independent alternating current sources, a circuit supplied with a single phase E. M. F. from one of said alternating current sources, a circuit supplied with polyphase E. M. F.'s from another of said alternating current sources, a pair of relays, means for causing one of said relays to be intermittently actuated in response to variations in the vector sum of said single phase E. M. F. and the E. M. F. of one phase of said polyphase E. M. F.'s when the frequencies of said alternating current sources are unequal, means for causing the other of said relays to be intermittently actuated in response to variations in the vector sum of said single phase E. M. F. and the E. M. F. of another phase of said polyphase E. M. F.'s when the frequencies of said sources are unequal, means actuated by the actuation of one of said relays for locking both of said relays in their respective positions, and means for rendering said locking means inoperative after a predetermined time.

14. In combination, a plurality of independent alternating current sources, a circuit supplied with a single phase E. M. F., from one of said sources, a circuit supplied with polyphase E. M. F.'s from another of said alternating current sources, a pair of relays, means for causing one of said relays to be intermittently actuated in response to variations in the vector sum of said single phase E. M. F. and the E. M. F., of one phase of said polyphase E. M. F.'s when the frequencies of said alternating current sources are unequal, means for causing the other of said relays to be intermittently actuated in response to variations in the vector sum of said single phase E. M. F. and the E. M. F. of another phase of said polyphase E. M. F.'s when the frequencies of said sources are unequal whereby said relays are actuated in predetermined sequences dependent upon the relative frequencies of said sources, a reversible translating device, and means for causing said translating device to operate in one direction in response to the actuation of both of said relays and for causing said translating device to operate in the reverse direction in response to the actuation of a certain one only of said relays.

15. In combination, two alternating current circuits, and means for controlling the frequency of one of said circuits including two electroresponsive devices respectively responsive to a function of a voltage of one of said circuits and a voltage of the other of said circuits and a function of said voltage of one of said circuits and another voltage of said other circuit.

16. In combination, two alternating current circuits, means for controlling the frequency of one of said circuits including a plurality of devices respectively energized in response to different voltages obtained from said circuits whereby the sequence of operation of said devices depends upon the relative frequencies of the voltages of said circuits, and means controlled by one device for rendering the other device inoperative.

17. In combination, two alternating current circuits, means for controlling the frequency of one of said circuits including two electroresponsive devices respectively responsive to a function of a voltage of one of said circuits and a voltage of the other of said circuits and a function of said voltage of one of said circuits and another voltage of said circuits, and means controlled by one of said electroresponsive devices for rendering the other of said electroresponsive devices inoperative.

18. In combination, two polyphase circuits, means for controlling the frequency of one of said circuits including two electroresponsive devices respectively responsive to a function of a voltage of one of said circuits and a voltage of the other of said circuits and a function of said voltage of one of said circuits and another voltage of said other circuit, and means controlled by one device for rendering the other device inoperative.

19. In combination, two alternating current circuits, means for changing the frequency of one of said circuits, means including an electroresponsive device responsive to a predetermined resultant of a voltage of one of said circuits and a voltage of the other of said circuits for effecting the operation of said frequency changing means to increase the frequency controlled thereby for a predetermined length of time only whenever said predetermined resultant occurs, means including an electroresponsive device responsive to a predetermined resultant of said voltage of one of said circuits and another voltage of the other of said circuits for effecting the operation of said frequency changing means to decrease the frequency controlled thereby for a predetermined time only whenever said last mentioned predetermined resultant occurs, and means controlled by one of said devices for controlling the energization of the other of said devices whereby the operation of said frequency changing means cannot be effected to both increase and decrease the frequency at any given instant.

20. In combination, two alternating current circuits, an electroresponsive device connected to said circuits so that it is energized in response to a function of a voltage of one of said circuits and a voltage of the other of said circuits, a control circuit, and means controlled by said electroresponsive device for completing said control circuit for a predetermined length of time, another electroresponsive device connected to said circuits so that it is energized in response to a function of said voltage of said one of said circuits and another voltage of said other of said circuits, a second control circuit, means controlled by said last mentioned electroresponsive device for completing said last mentioned control circuit for a predetermined length of time, and means controlled by said devices for preventing both of said control circuits from being simultaneously completed.

PAUL M. STIVENDER.